United States Patent
Senkal et al.

(10) Patent No.: US 10,746,565 B2
(45) Date of Patent: Aug. 18, 2020

(54) DEMODULATION PHASE CALIBRATION

(71) Applicant: InvenSense, Inc., San Jose, CA (US)

(72) Inventors: Doruk Senkal, San Jose, CA (US);
Joseph Seeger, Menlo Park, CA (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/370,664

(22) Filed: Mar. 29, 2019

(65) Prior Publication Data

US 2019/0226871 A1 Jul. 25, 2019

Related U.S. Application Data

(63) Continuation of application No. 15/173,530, filed on Jun. 3, 2016, now Pat. No. 10,267,650.

(51) Int. Cl.
*G01C 25/00* (2006.01)
*G01C 19/5614* (2012.01)
*G01C 19/5726* (2012.01)
*G01C 19/5649* (2012.01)
*G01C 19/5776* (2012.01)

(52) U.S. Cl.
CPC ....... *G01C 25/005* (2013.01); *G01C 19/5614* (2013.01); *G01C 19/5649* (2013.01); *G01C 19/5726* (2013.01); *G01C 19/5776* (2013.01)

(58) Field of Classification Search
CPC .......... G01C 19/5614; G01C 19/5649; G01C 19/5726; G01C 19/5776; G01C 25/005
See application file for complete search history.

(56) References Cited

U.S. PATENT DOCUMENTS

| 10,267,650 | B2 * | 4/2019 | Senkal | G01C 25/005 |
| 2015/0057959 | A1 * | 2/2015 | Ezekwe | G01C 19/5776 |
| | | | | 702/96 |
| 2015/0114082 | A1 * | 4/2015 | Blanchard | G01C 25/005 |
| | | | | 73/1.77 |
| 2015/0192415 | A1 | 7/2015 | Ge et al. | |
| 2016/0084654 | A1 | 3/2016 | Senkal et al. | |

OTHER PUBLICATIONS

PCT International Search Report and Written Opinion dated Aug. 25, 2017 in International Application No. PCT/US2017/035267. 13 pages.

* cited by examiner

*Primary Examiner* — Paul M. West (57) ABSTRACT

A method includes receiving a signal from a sensor. The signal includes a first in-phase component and a first quadrature component. The first in-phase and quadrature components are identified. A rate signal is applied to the sensor and the sensor generates a sensed rate signal. A second in-phase and quadrature components associated with the sensed rate signal are determined. A phase error based on the first and the second in-phase components, and the first and the second quadrature components is determined. The method may further include reducing error in measurements associated with the sensor by dynamically compensating for the determined phase error, e.g., by modifying a clock signal, by changing a demodulation phase of a demodulator used to identify the in-phase and the quadrature components.

20 Claims, 8 Drawing Sheets

DEMODULATION PHASE CALIBRATION

RELATED APPLICATIONS

The instant application is a continuation application and claims the benefit and priority to the U.S. patent application Ser. No. 15/173,530 filed on Jun. 3, 2016, which is incorporated herein by reference in its entirety.

BACKGROUND

Micro-electromechanical systems (MEMS) and their use has become prevalent. For example, MEMS may be used as an accelerometer, gyroscope, optical switching, microphones, silicon pressure sensor, magnetic sensor, etc., in various industries such as the airbag industry, the aviation industry, the display industry, the tire pressure industry, etc. Unfortunately, package stress may cause error and degradation in the performance of the MEMS structure. For example, package stress may induce an offset shift in a MEMS structure, e.g., a quadrature shift in a gyroscope, resulting in an error by introducing error in gyroscope demodulation phase angle.

SUMMARY

Accordingly, a need has arisen to determine errors introduced, e.g., by package stress, and further to calibrate the MEMS structure in order to improve the performance of the MEMS device. Provided herein is a method and system for determining an error resulting from various factors such as package stress. The determined error may be used to calibrate the demodulation phase of a gyroscope in order improve performance of the gyroscope.

According to some embodiments, a method includes receiving a signal from a sensor, wherein the signal comprises a first in-phase component and a first quadrature component. The method further includes identifying the first in-phase component. The method also includes identifying the first quadrature component. A rate signal may be applied to the sensor, wherein the sensor in response to the applying the rate signal generates a sensed rate signal. A second in-phase component associated with the sensed rate signal and a second quadrature component associated with the sensed rate signal may be determined. A phase error may be determined based on the first and the second in-phase components, and the first and the second quadrature components.

The identifying the first in-phase component, the identifying the first quadrature component, and the determining the second in-phase component and the second quadrature component may be through sequential demodulation of the signal and the sensed rate signal. The identifying the first in-phase component may be through demodulation of the signal using a first demodulator, and the identifying the first quadrature component may be through demodulation of the signal using a second demodulator. It is appreciated that the first demodulator may be independent from the second demodulator, and the first demodulator and the second demodulator may be configured to identify the first in-phase component and the first quadrature component simultaneously.

It is appreciated that the second in-phase component may be determined through demodulation of the sensed signal using the first demodulator, and the second quadrature component may be determined through demodulation of the sensed signal using the second demodulator, and the first demodulator and the second demodulator may be configured to identify the second in-phase component and the second quadrature components of the sensed rate signal simultaneously.

The method may further include applying a rotation to the sensor to generate the rate signal. In some embodiments, the method may include changing rotation rate of the sensor to generate a change in the rate signal. For example, the change in rotation rate may occur by applying electrostatic force, a magnetic force, and a piezoelectric force.

The method may further include determining a difference of the first quadrature component and the second quadrature component to generate a quadrature difference, determining a difference of the first in-phase component and the second in-phase component to generate an in-phase difference, and determining the phase error by processing an arctangent of the quadrature difference and the in-phase difference.

In some embodiments, the method may further include reducing error in measurements associated with the sensor by dynamically compensating for the determined phase error. It is appreciated that a clock signal may be modified based on the determined phase error to reduce error, and the modified clock may be used in determining in-phase and quadrature components.

The method may further include changing a demodulation phase of a demodulator used to identify the first in-phase component, the first quadrature component, the second in-phase component, and the second quadrature component.

It is appreciated that the sensor device may be a micro-electro-mechanical system gyroscope.

It is appreciated that the phase error detection may occur in response to detecting a motion. The method may include periodically applying another rate signal to the sensor to generate another sensed signal, determining another in-phase component and another quadrature component associated with the another sensed rate signal, and updating the phase error based on the determining another in-phase component and the another quadrature component associated with the another sensed rate signal.

It is appreciated that in some embodiments the method may include determining a difference of the first quadrature component and the second quadrature component to generate a quadrature difference, determining a difference of the first in-phase component and the second in-phase component to generate an in-phase difference, and determining sensitivity associated with the sensor based on the quadrature difference and the in-phase difference.

In some embodiments, a device may include a sensor device, a first demodulator, a second demodulator, and a processing unit. The sensor device may be configured to generate a signal comprising a first in-phase component and a first quadrature component. The first demodulator may be configured to identify the first in-phase component. The second demodulator may be configured to identify the second quadrature component. The processing unit may be configured to determine a phase error associated with the sensor device. It is appreciated that the phase error may be determined based on the first quadrature component and the first in-phase component and may be further based on a second in-phase component associated with a sensed rate signal and a second quadrature component associated with the sensed rate signal. It is appreciated that the first in-phase component may be determined by the first demodulator and the first quadrature component may be determined by the second demodulator. According to some embodiments, the sensed rate signal may be generated by the sensor device in response to application of a rate signal thereto.

In some embodiments, the device may further include a first filter coupled to the first demodulator. The first filter may be configured to generate an averaged in-phase component signal for transmission to the processing unit for determining the phase error. The device may also include a second filter coupled to the second demodulator. The second filter may be configured to generate an averaged quadrature component signal for transmission to the processing unit for determining the phase error. According to some embodiments, the first filter and the second filter are selected from a group consisting of a low pass filter, integrator, and a bandpass filter.

It is appreciated that the sensor device may be a microelectro-mechanical system gyroscope.

The processing unit may be configured to calculate a difference between the first quadrature component and the second quadrature component to generate a quadrature component difference. It is appreciated that the processing unit may be further configured to calculate a difference between the first in-phase component and the second in-phase component to generate an in-phase component difference. In some embodiments, the processing unit is further configured to determine the phase error by calculating the arctangent of the quadrature component difference and the in-phase component difference. In some embodiments, the processing unit is selected from a group consisting of a central processor, a field programmable gate array (FPGA), and an application specific integrated circuit (ASIC).

According to some embodiments, output readings from the sensor device may be calibrated to compensate for the phase error.

In some embodiments, the processing unit may be configured to calculate a difference between the first quadrature component and the second quadrature component to generate a quadrature component difference. The processing unit may further be configured to calculate a difference between the first in-phase component and the second in-phase component to generate an in-phase component difference. In some embodiments, the processing unit may be further configured to determine sensitivity of the sensor device based on the quadrature component difference and the in-phase component difference.

In some embodiments, a device may include a sensor device, a demodulator, and a processing unit. The sensor device may be configured to generate a signal comprising a first in-phase component and a first quadrature component. The demodulator may be configured to sequentially identify the first in-phase component and the first quadrature component. In some embodiments, the processing unit may be configured to determine a phase error associated with the sensor device. It is appreciated that the phase error may be determined based on the first quadrature component and the first in-phase component and is further based on a second in-phase component associated with a sensed rate signal and a second quadrature component associated with the sensed rate signal. According to some embodiments, the second in-phase component and the second quadrature component may be sequentially determined by the demodulator. In some embodiments, the sensed rate signal may be generated by the sensor device in response to application of a rate signal thereto.

The device may include a filter coupled to the demodulator. The filter may be configured to generate an averaged component signal received from the demodulator. In some embodiments, the filter is selected from a group consisting of a low pass filter, integrator, and a bandpass filter. According to some embodiments the averaged component signal may be transmitted to the processing unit for determining the phase error.

It is appreciated that the sensor device may be a microelectro-mechanical system gyroscope.

The processing unit may be configured to calculate a difference between the first quadrature component and the second quadrature component to generate a quadrature component difference. In some embodiments the processing unit may be further configured to calculate a difference between the first in-phase component and the second in-phase component to generate an in-phase component difference. It is appreciated that the processing unit may further be configured to determine the phase error by calculating the arctangent of the quadrature component difference and the in-phase component difference. It is appreciated that the processing unit may be selected from a group consisting of a central processor, a field programmable gate array (FPGA), and an application specific integrated circuit (ASIC). According to some embodiments, output readings from the sensor device is calibrated to compensate for the phase error.

These and other features and aspects of the concepts described herein may be better understood with reference to the following drawings, description, and appended claims.

DETAILED DESCRIPTION

Before various embodiments are described in greater detail, it should be understood by persons having ordinary skill in the art that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing the certain concepts, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "forward," "reverse," "clockwise," "counter clockwise," "up," "down," or other similar terms such as "upper," "lower," "above," "below," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the embodiments pertain.

A need has arisen to determine errors introduced, e.g., by package stress, and further to calibrate the MEMS structure in order to improve the performance of the MEMS device. Provided herein is a method and system for determining an error resulting from various factors such as package stress. The determined error may be used to calibrate the demodulation phase of a gyroscope in order improve performance of the gyroscope.

Figure 1A:
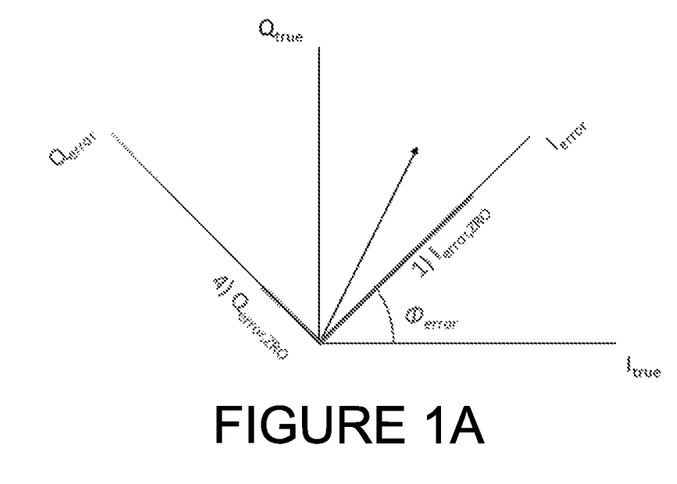
FIGS. 1A-1C show orientation of Coriolis vector in phase domain for calculating a phase error in accordance with some embodiments.
Figure 1B:
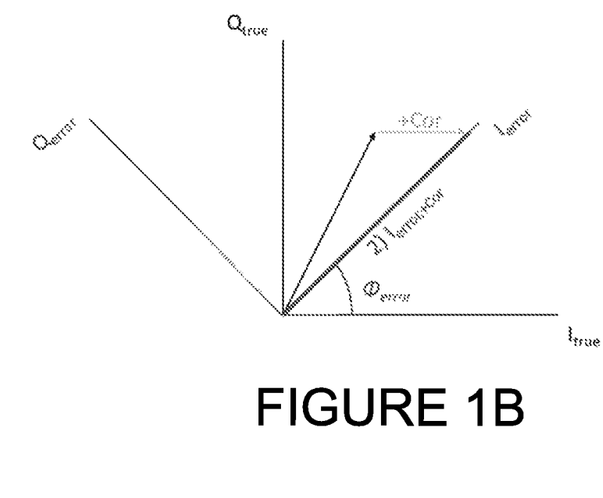
Figure 1C:
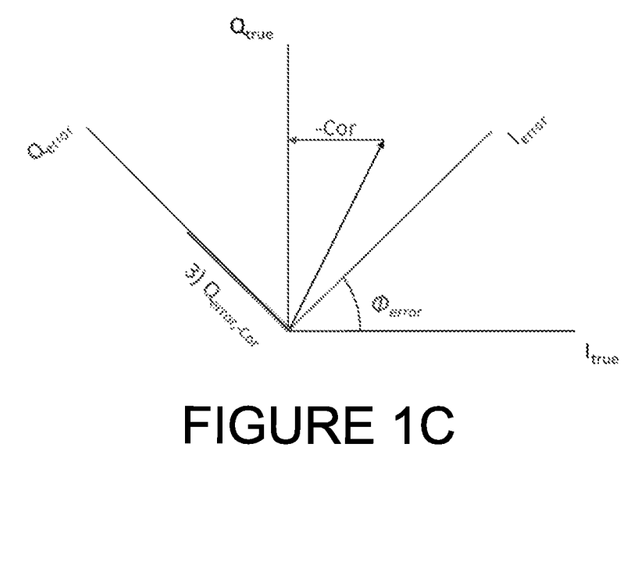

Referring now to FIGS. 1A-1C, orientation of Coriolis vector in phase domain for calculating a phase error in accordance with some embodiments is shown. According to some embodiments, the orientation of the Coriolis vector in the phase domain may be determined using a rate table characterization. It is appreciated that aligning the sense mode demodulation phase to the Coriolis vector, e.g., by changing the demodulation phase, may improve the performance of the gyroscope. Thus, the demodulation phase angle of the gyroscope can be trimmed to Coriolis signal, improving the performance of the gyroscope.

FIG. 1A shows the in-phase and the quadrature components of a gyroscope. It is appreciated that the true in-phase and the true quadrature components may be unknown. As such, the phase error, for example resulting from package stress, may also be unknown. It is appreciated that the in-phase error and the quadrature error components may be $$\begin{bmatrix} I_{error} \\ Q_{error} \end{bmatrix} = \begin{bmatrix} \cos(\phi_{error}) & \sin(\phi_{error}) \\ -\sin(\phi_{error}) & \cos(\phi_{error}) \end{bmatrix} \begin{bmatrix} I_{true} \\ Q_{true} \end{bmatrix}. \quad (1)$$

It is, however, appreciated that the in-phase component at zero rate output may be measured, as depicted as $I_{error,ZRO}$ in FIG. 1A. Similarly, the quadrature component at zero output may be measured, as depicted as $Q_{error,ZRO}$ in FIG. 1A. It is appreciated that the in-phase error and the quadrature error components for zero rate output may be measured and it may be $$\begin{bmatrix} I_{error,ZRO} \\ Q_{error,ZRO} \end{bmatrix} = \begin{bmatrix} \cos(\phi_{error}) & \sin(\phi_{error}) \\ -\sin(\phi_{error}) & \cos(\phi_{error}) \end{bmatrix} \begin{bmatrix} I_{true} \\ Q_{true} \end{bmatrix}. \quad (2)$$

It is appreciated that the in-phase component at a rate input may be measured, as depicted as $I_{error,+Cor}$ in FIG. 1B. Similarly, the quadrature component at a rate input may be measured, as depicted as $Q_{error,+Cor}$ in FIG. 1B. It is appreciated that the in-phase error and the quadrature error components for the rate input may be measured and it may be $$\begin{bmatrix} I_{error,+Cor} \\ Q_{error,+Cor} \end{bmatrix} = \begin{bmatrix} \cos(\phi_{error}) & \sin(\phi_{error}) \\ -\sin(\phi_{error}) & \cos(\phi_{error}) \end{bmatrix} \begin{bmatrix} I_{true+Cor} \\ Q_{true} \end{bmatrix}. \quad (3)$$

It is further appreciated that the in-phase component at another rate input may be measured, as depicted as $I_{error,-Cor}$ in FIG. 1C. Similarly, the quadrature component at another rate input may be measured, as depicted as $Q_{error,-Cor}$ in FIG. 1C. It is appreciated that the in-phase error and the quadrature error components for another rate input may be measured and it may be $$\begin{bmatrix} I_{error,-Cor} \\ Q_{error,-Cor} \end{bmatrix} = \begin{bmatrix} \cos(\phi_{error}) & \sin(\phi_{error}) \\ -\sin(\phi_{error}) & \cos(\phi_{error}) \end{bmatrix} \begin{bmatrix} I_{true\_Cor} \\ Q_{true} \end{bmatrix}. \quad (4)$$

Accordingly, the phase error may be determined.

$$\phi_{error} = \arctan(B,A) \quad (5)$$

where $A = I_{error,+Cor} - I_{error,ZRO} = \text{Cor} \cdot \cos(\phi_{error})$ (6)

and $$B = Q_{error,ZRO} - Q_{error,-Cor} = \text{Cor} \cdot \sin(\phi_{error}). \quad (7)$$

In other words, the phase error that has been determined may be used to trim and align the phase of the gyroscope, e.g., by modifying the phase of the demodulator or changing the phase of the clock, to the Coriolis vector. It is appreciated that the sensitivity of the gyroscope may also be determined using the quadrature difference and the in-phase difference $$|\text{Cor}| = \sqrt{A^2 + B^2}. \quad (8)$$

Figure 2:
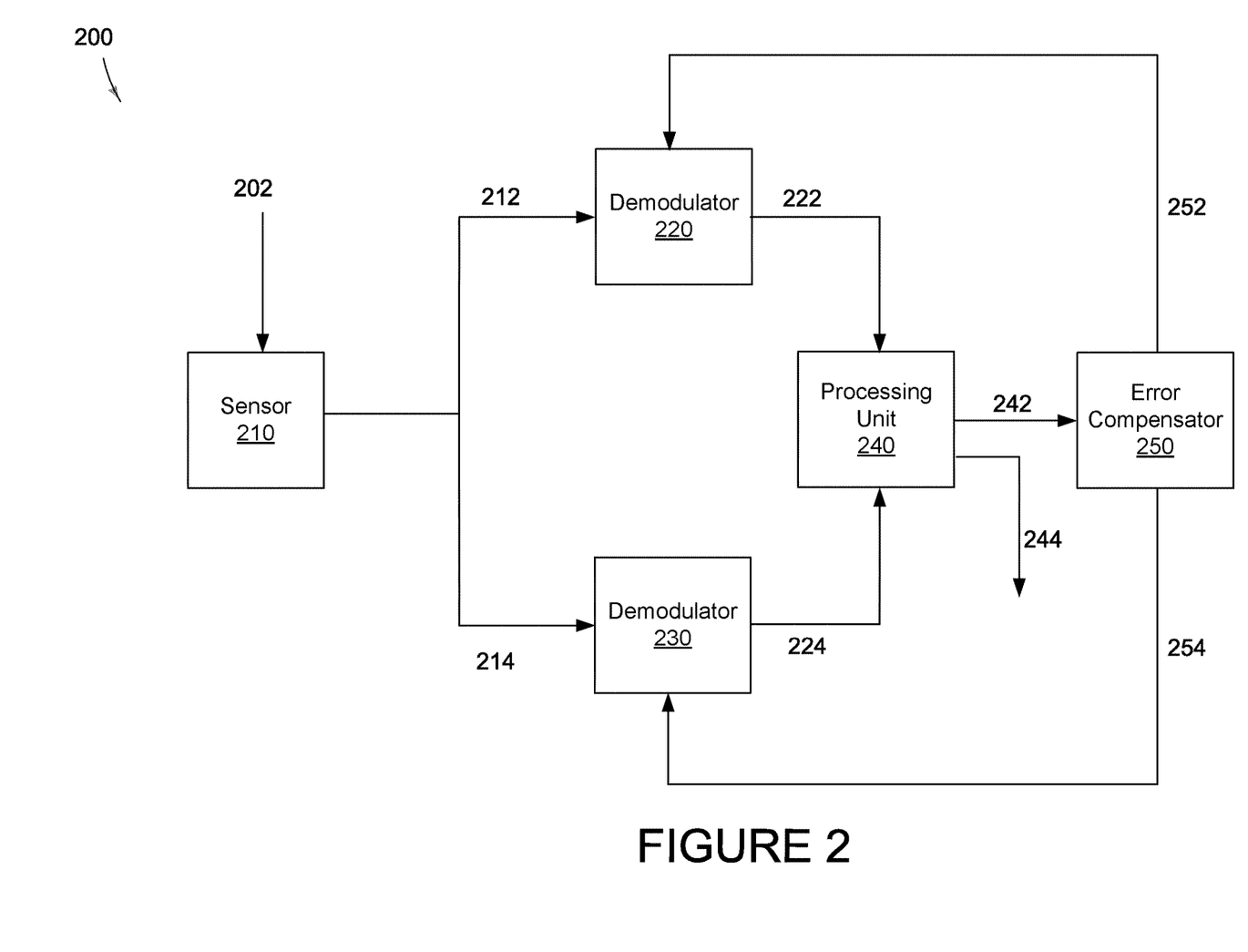
FIG. 2 shows a system for determining a phase error and for compensating the phase error in accordance with some embodiments.

Referring now to FIG. 2, a system for determining a phase error and for compensating the phase error in accordance with some embodiments is shown. It is appreciated that FIG. 2 depicts an embodiment for implementing the determination of the phase error, for example due to package stress, determination of the sensitivity of the gyroscope as well as compensating for the determined error in order to improve performance of the gyroscope.

System 200 includes a sensor 210, e.g., a gyroscope, demodulators 220 and 230, a processing unit 240, and an error compensator 250. The sensor 210 may be a gyroscope, a magnetometer, etc., and it may include various components such as a piezo element. The sensor 210 receives an input signal, e.g., zero rate output according to FIG. 1A, a rate input according to FIGS. 1B and 1C or an input signal resulting from movements, rotation, electrostatic force, a magnetic force, etc.

The sensor 210 may then output signal 212 to the demodulator 220 and it may output signal 214 to the demodulator 230. The output signal from the sensor 210 may be the sensed signal due to zero rate output or other rate inputs. It is appreciated that according to some embodiments the two separate paths are configured to detect the in-phase and the quadrature components. For example, signal 212 input to the demodulator 220 may identify the in-phase component where as signal 214 input to the demodulator 230 may identify the quadrature component of the signal.

According to some embodiments, the demodulator 220 may output the in-phase component 222 to the processing unit 240 and the demodulator 230 may output the quadrature component 224 to the processing unit 240. It is appreciated that the in-phase and the quadrature components may include the zero rate output, and two rate inputs as discussed with respect to FIGS. 1A-1C. It is appreciated that the processing unit 240 may be configured to determine the phase error based on the received signals from the demodulators 220 and 230 and according to equations (1)-(8). It is appreciated that a change in rotation may cause a change in the rate input. In some embodiments, the change in rotation may be achieved using one or more actuators. It is appreciated that according to some embodiments, the actuator may be configured to periodically change the rotation rate. Accordingly, the phase error may be periodically estimated and corrected.

It is further appreciated that the sensitivity of the sensor 210 may also be determined by the processing unit 240. The processing unit 240 may output the readings 244 and 242. Output signals 244 may be used as the output reading of the device.

Signal 242 may be input to the error compensator 250. Signal 242 may be the phase error that has been determined by the processing unit 240 and according to equations (1)-(8) above. The error compensator 250 may be configured to use the determined phase error to modify the operation of the demodulators 220 and 230 respectively to adjust for the determined error. For example, the error compensator 250 may transmit a signal 252 to the demodulator 220 in order to modify the operation of the demodulator 220 in order to compensate for the determined error associated with the in-phase component. Similarly, the error compensator 250 may transmit a signal 254 to the demodulator 230 in order to modify the operation of the demodulator 230 in order to compensate for the determined error associated with the quadrature component.

It is appreciated that in some embodiments, the processing unit 240 may be configured to trigger phase error calculation in response to a change in the rate signal. For example, a first in-phase and quadrature components (e.g., at zero rate) may be determined before application of the change in the rate signal (e.g., through an actuator). The in-phase and the quadrature components associated with the change in rate signal may be determined after the rate signal is changed, e.g., by using an actuator.

It is appreciated that the processing unit 240 may be triggered to calculate phase errors in response to a difference between the first and second rate signals (e.g., difference between the zero rate and change in the rate signal) exceeding a threshold. In some embodiments, the processing unit 240 may be triggered to calculate phase errors in response to a difference between the first and second in-phase components exceeding a threshold. The first and the second in-phase components may be components associated with two different rate signals, e.g., zero rate and a changed rate for instance. It is appreciated that according to some embodiments, the processing unit 240 may be triggered to calculate phase errors in response to a difference between the first and second quadrature components exceeding a threshold. The first and the second quadrature components may be components associated with two different rate signals, e.g., zero rate and a changed rate for instance. It is appreciated that the processing unit 240 may be triggered to calculate phase errors in response to a difference between the first and second sensed signal exceeding a threshold. It is appreciated that the first and the second sensed signals may be output signals of the sensor 210 in response to various rate inputs, e.g., at zero rate and at a changed rate. According to some embodiments, the zero rate may be associated with no motion and a changed rate may be associated with a constant rate, a transient rate or a rotation.

According to some embodiments, the phase error correction may be applied, e.g., by the error compensator 250, in response to a change in rotation rate, e.g., zero rate and a changed rate. In some embodiments, the change in rate signal may be a difference in average rates over a period of time.

Figure 3:
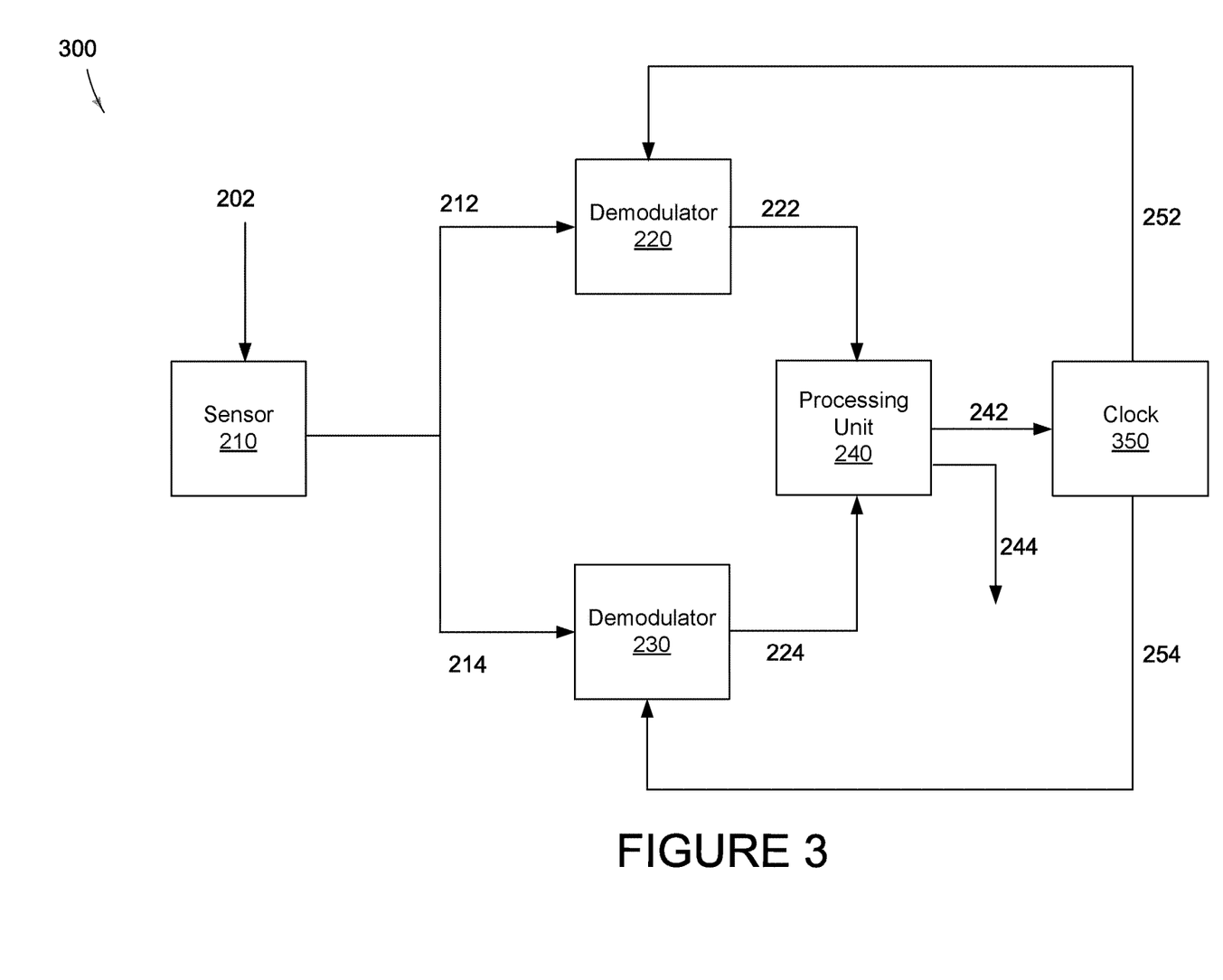
FIG. 3 shows another system for determining a phase error and for compensating the phase error in accordance with some embodiments.

Referring now to FIG. 3, another system for determining a phase error and for compensating the phase error in accordance with some embodiments is shown. System 300 is substantially similar to that of FIG. 2. However, the error compensator 250 is replaced with a clock 350 component. The clock 350 may receive the determined phase error and it may adjust the phase of the clocking signal for the demodulators 220 and 230. As such, the demodulators 220 and 230 may be aligned with the Coriolis signal and quadrature signal respectively.

Figure 4:
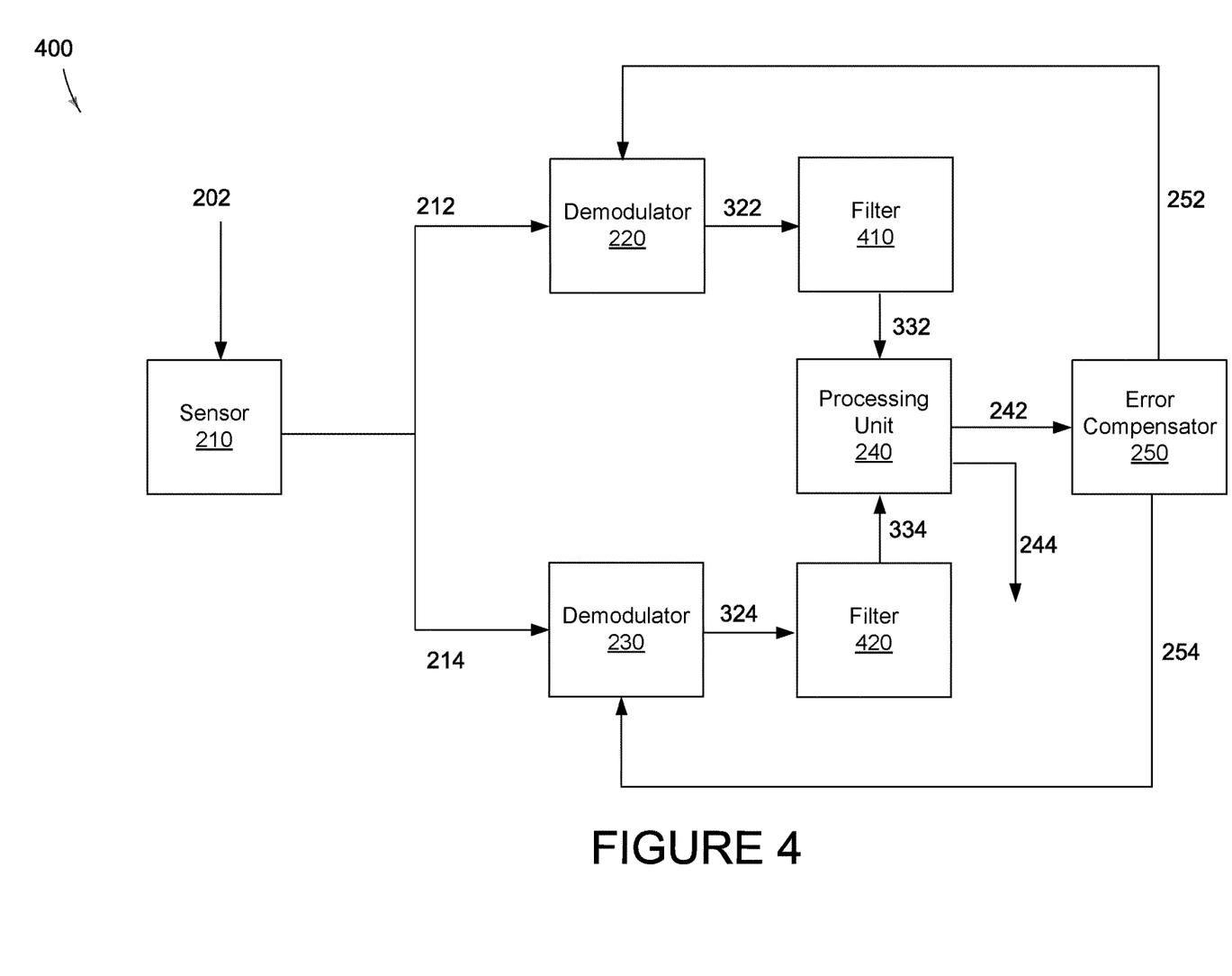
FIG. 4 shows one system for determining a phase error and for compensating the phase error in accordance with some embodiments.

Referring now to FIG. 4, one system for determining a phase error and for compensating the phase error in accordance with some embodiments is shown. The system 400 is substantially similar to that of FIG. 2 except that filters 410 and 420 associated with the demodulators 220 and 230 respectively are used to average the signals before transmission to the processing unit 240. It is appreciated that the filters 410 and 420 may be a low pass filter, integrator, a bandpass filter, or any combination thereof.

It is appreciated that FIG. 2-4 depict embodiments where the in-phase and the quadrature components can be determined simultaneously because of different paths, one for the in-phase path and another for the quadrature path. It is also appreciated that the determination of the phase error, the sensitivity, and the compensation for the error may occur at a manufacturing site where the error is compensated for or it may alternatively occur dynamically during use and in response to detecting a motion, e.g., movement, rotation, etc. For example, the phase error determination may occur in response to detecting a movement, a rotation, etc., and the phase error may be corrected and compensated for resulting therefrom. It is also appreciated that the phase error determination may occur periodically (e.g., predetermined periods), such as once every hour, once a day, once a month, etc. in order to calibrate the device.

Figure 5:
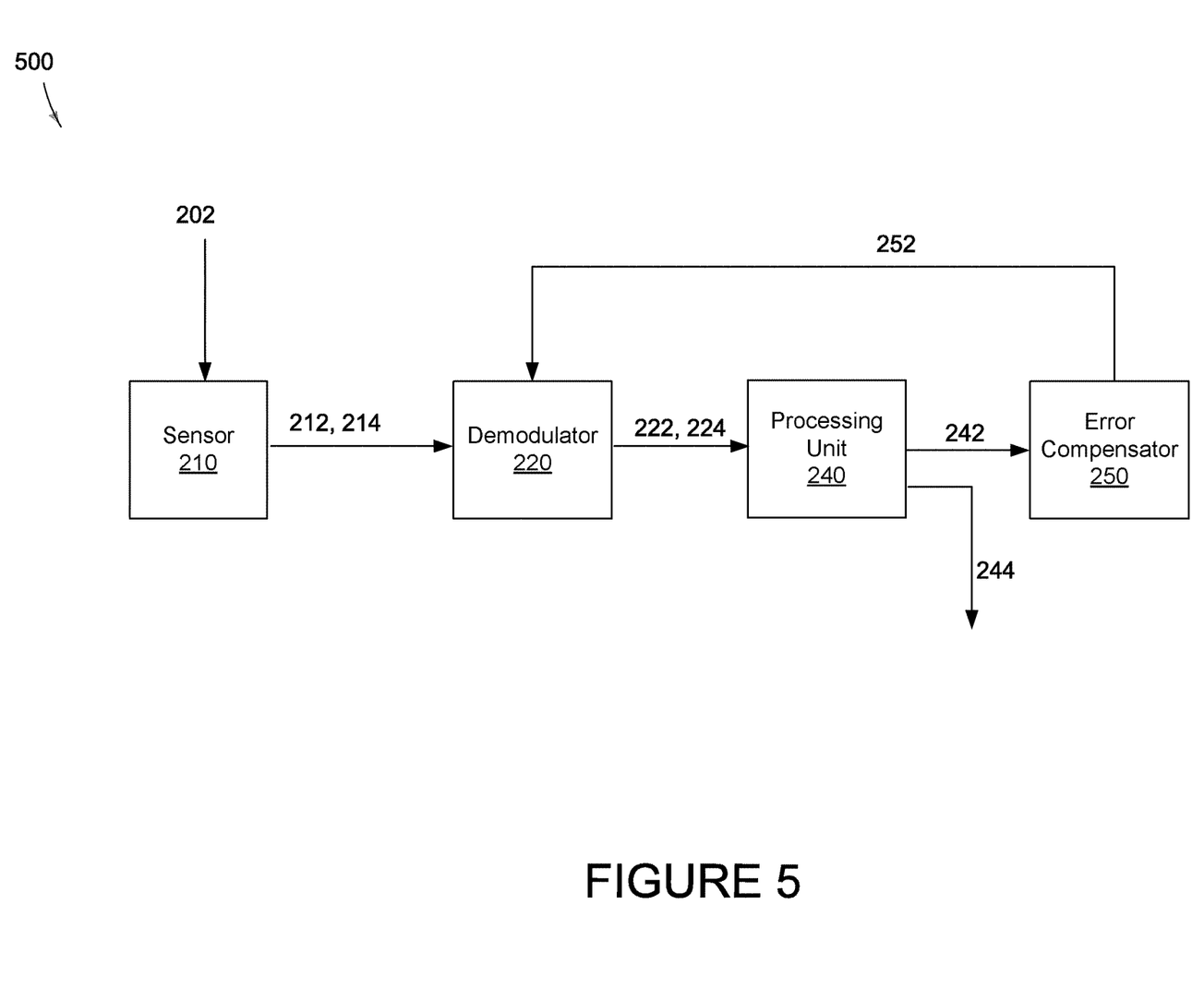
FIG. 5 shows a single demodulator system for determining a phase error and for compensating the phase error in accordance with some embodiments.

Referring now to FIG. 5, a single demodulator system for determining a phase error and for compensating the phase error in accordance with some embodiments is shown. FIG. 5 is similar to that of FIG. 2 except that in this embodiment the in-phase component and the quadrature component are determined using the same path and therefore the same components. In other words, the in-phase components, e.g., zero rate output, rate inputs, etc., may occur in sequence with respect to one another and further with respect to the quadrature components for zero rate output, rate inputs, etc. In other words, the system 500 determines the in-phase components for the zero rate out, and the rate inputs sequentially. Similarly, the system 500 determines the quadrature components for the zero rate out, and the rate inputs sequentially. The processing unit 240 may use the in-phase components and the quadrature components that have been received sequentially to determine the phase error. The error compensator 250 may use the determined phase error in order to compensate for the error similar to that of FIG. 2.

Figure 6:
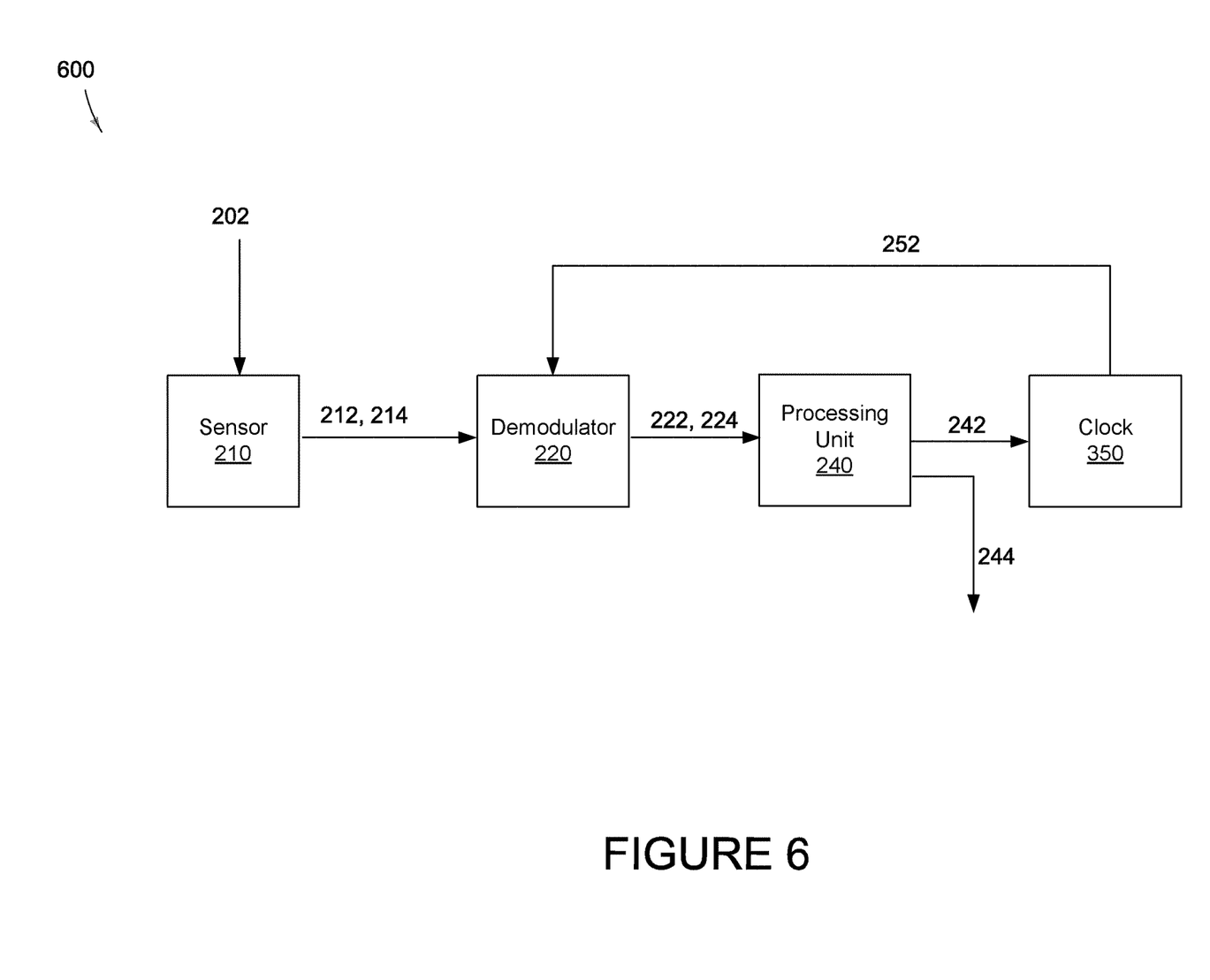
FIG. 6 shows another single demodulator system for determining a phase error and for compensating the phase error in accordance with some embodiments.

Referring now to FIG. 6, another single demodulator system for determining a phase error and for compensating the phase error in accordance with some embodiments is shown. FIG. 6 operates substantially similar to that of FIG. 5 except that the error compensator 250 has been replaced by the clock 350 where it operates similar to that of FIG. 3.

Figure 7:
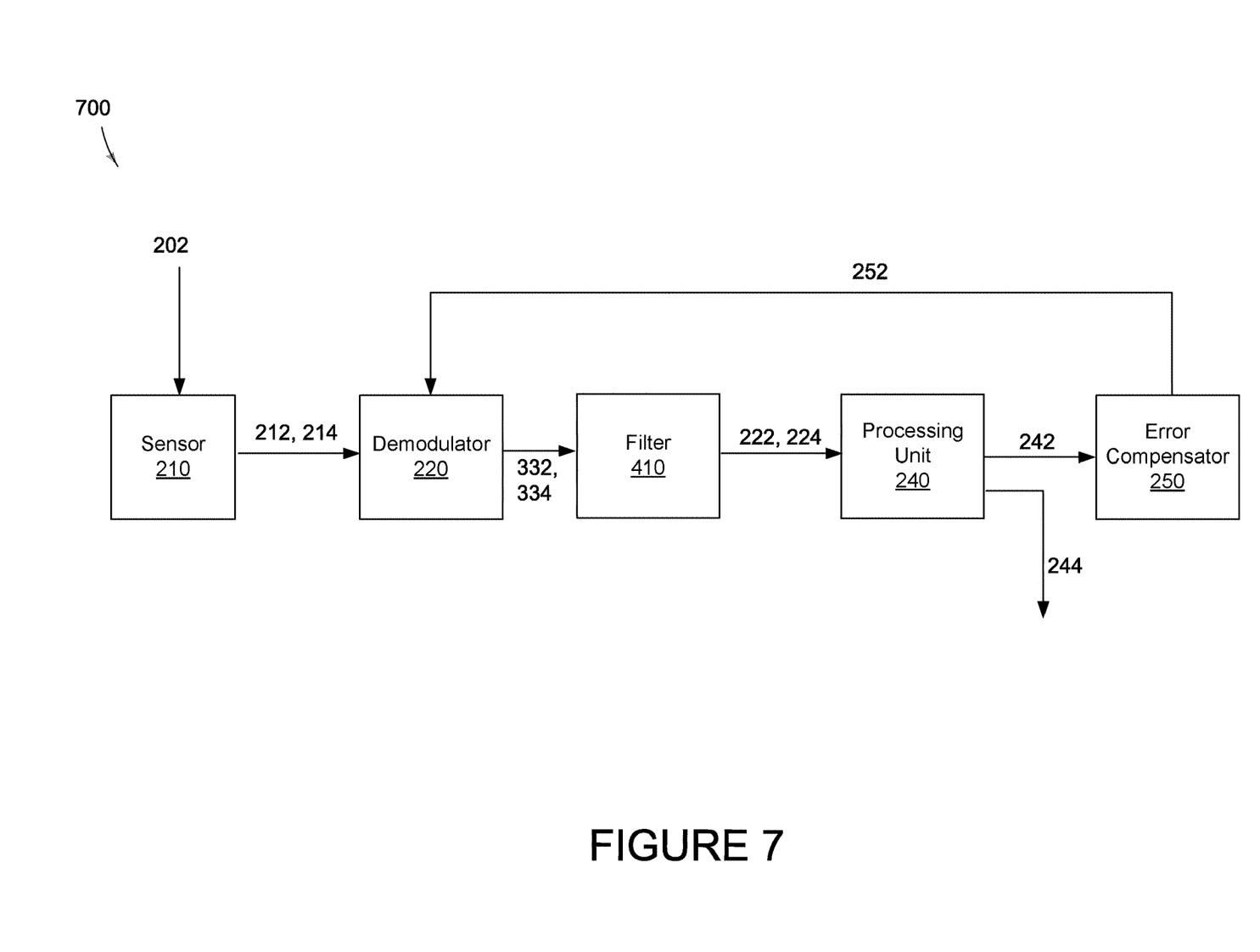
FIG. 7 shows yet another single demodulator system for determining a phase error and for compensating the phase error in accordance with some embodiments.

Referring now to FIG. 7, yet another single demodulator system for determining a phase error and for compensating the phase error in accordance with some embodiments is shown. FIG. 7 operates substantially similar to that of FIG. 5 except that the filter 410 is introduced in order to average the signals being transmitted to the processing unit 240. The operation of the filter 410 is similar to that described in FIG. 4.

It is appreciated that FIGS. 5-7 depict embodiments where the in-phase and the quadrature components are determined sequentially by sharing the same path for the in-phase path and the quadrature component. It is also appreciated that the determination of the phase error, the sensitivity, and the compensation for the error may occur at a manufacturing site where the error is compensated for or it may alternatively occur dynamically during use and in response to detecting a motion, e.g., movement, rotation, etc. For example, the phase error determination may occur in response to detecting a movement, a rotation, etc., and the phase error may be corrected and compensated for resulting therefrom. It is also appreciated that the phase error determination may occur periodically (e.g., predetermined periods), such as once every hour, once a day, once a month, etc. in order to calibrate the device.

Figure 8:
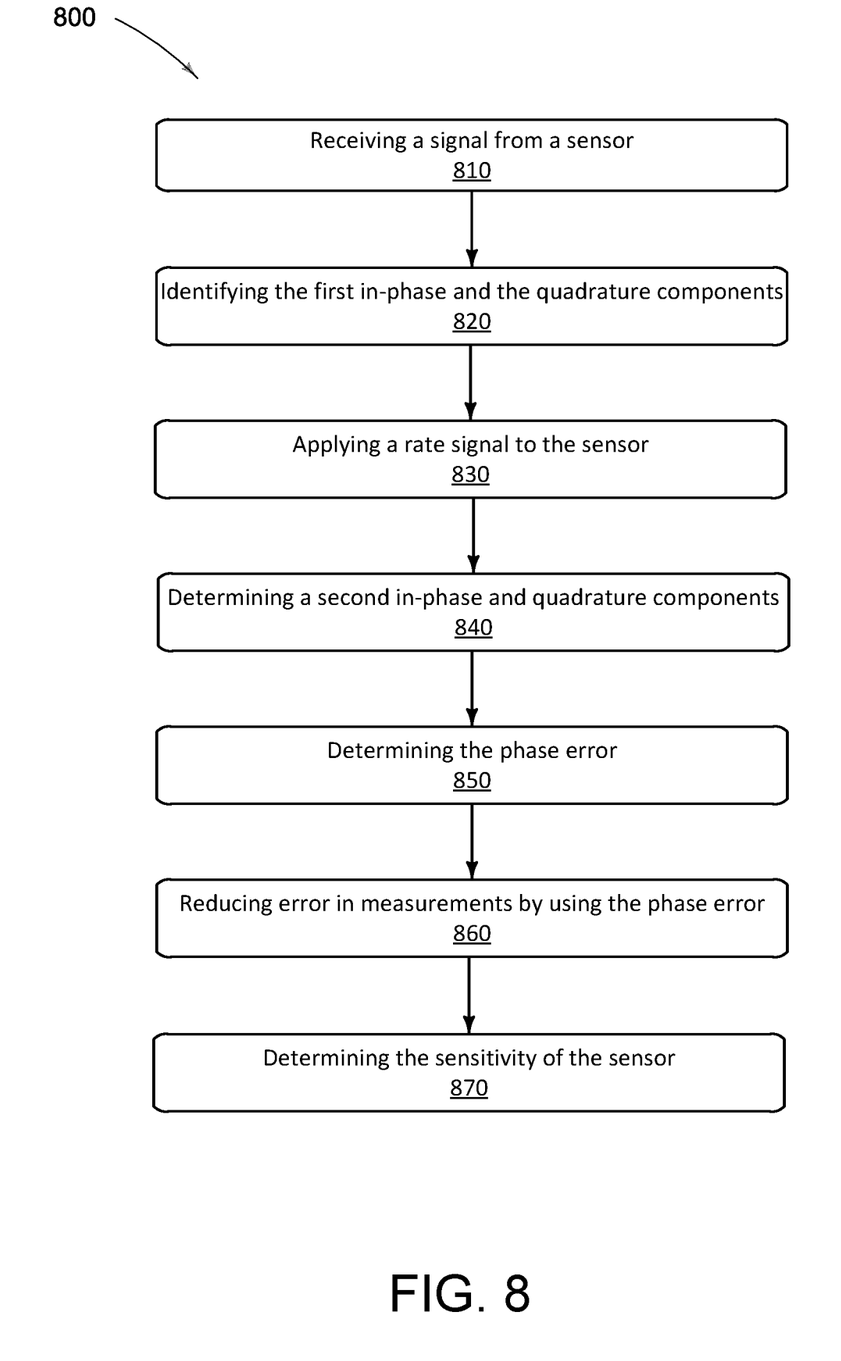
FIG. 8 shows a flow diagram for determining a phase error and for compensating for the phase error in accordance with some embodiments.

Referring now to FIG. 8, a flow diagram 800 for determining a phase error and for compensating for the phase error in accordance with some embodiments is shown. At step 810, a signal e.g., zero rate output, is received from the sensor, e.g., MEMS, gyroscope, etc., as discussed above with respect to FIGS. 1A-7. At step 820, the first in-phase and the first quadrature components may be identified, e.g., by using one or more modulators as described above with respect to FIGS. 1A-7. It is appreciated that the first in-phase and the first quadrature components may be determined sequentially using the same demodulator or simultaneously through independent modulators as described above.

At step 830, a rate signal, e.g., magnetic force, electrostatic force, rotation, movement, etc., is applied to the sensor. Accordingly, the sensor generates a sensed signal. At step 840, the second in-phase and the second quadrature components associated with the sensed signal may be identified, e.g., by using one or more modulators as described above with respect to FIGS. 1A-7. It is appreciated that the first in-phase and the first quadrature components may be determined sequentially using the same demodulator or simultaneously through independent modulators as described above.

At step 850, the phase error may be determined based on the first in-phase and quadrature components and further based on the second in-phase and quadrature components. For example, in some embodiments, the phase error may be determined based on a difference between the quadrature components (e.g., zero rate output and the rate signal) and further based on a difference between the in-phase components (e.g., zero rate output and the rate signal). In some embodiments, the phase error may be an arctangent of the two differences. It is appreciated that in some embodiments, the phase error may be the ration of the two differences.

It is appreciated that the determination of the phase error may occur periodically, in response to detecting a motion, or during the manufacturing process in order to calibrate the device, or any combination thereof. For example, the in-phase and the quadrature components may be periodically be identified and determined in response to detecting a motion or in response to application of another rate signal. A new phase error may therefore be calculated periodically or the old phase error may be updated.

At step 860, the error may be reduced by using the determined phase error in order to control the operation of the demodulator(s), as described in FIGS. 1A-7, in order to dynamically compensate for the determined error. For example, the clock signal used for the demodulator(s) may be modified based on the determined phase error, thereby changing the demodulation phase of the in-phase and the quadrature components.

It is appreciated that in some embodiments the same or a different rate signal may be applied to the sensor periodically and the process may be repeated in order to recalculate the phase error. As such, the device may be recalibrated periodically. It is appreciated that in one optional embodiment, at step 870, the sensitivity of the sensor may be calculated and determined based on the quadrature difference and the in-phase difference. For example, the sensitivity may be based on equation (9) above.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A device comprising:
  a sensor device configured to generate a first and a second sensed rate signals comprising a first and a second in-phase components and a first and a second quadrature components, wherein the first sensed rate signal is generated by the sensor device in response to application of a first rate signal thereto and wherein the second sensed signal is generated by the sensor device in response to application of a second rate signal thereto, and wherein the first and the second sensed rate signals are generated during a calibration process;
  a first demodulator configured to identify the first and the second in-phase components;
  a second demodulator configured to identify the first and the second quadrature components; and
  a processing unit configured to determine a phase error associated with the sensor device, wherein the phase error is determined based on the first quadrature component and the first in-phase component associated with the first sensed rate signal and is further based on the second in-phase component and the second quadrature component associated with the second sensed rate signal, wherein the processing unit is further configured to trigger phase error calculation in response to a change in rate signal, wherein the first in-phase and quadrature components are estimated before the change in rate signal and wherein the second in-phase and quadrature components are estimated after the change in rate signal.

2. The device as described by claim 1 further comprising:
a first filter coupled to the first demodulator, wherein the first filter is configured to generate an averaged in-phase component signal for transmission to the processing unit for determining the phase error; and
a second filter coupled to the second demodulator, wherein the second filter is configured to generate an averaged quadrature component signal for transmission to the processing unit for determining the phase error.

3. The device as described by claim 2, wherein the first filter and the second filter are selected from a group consisting of a low pass filter, integrator, and a bandpass filter.

4. The device as described by claim 1, wherein the sensor device is a micro-electro-mechanical system gyroscope.

5. The device as described by claim 1, wherein the processing unit is configured to calculate a difference between the first quadrature component and the second quadrature component to generate a quadrature component difference, and wherein the processing unit is further configured to calculate a difference between the first in-phase component and the second in-phase component to generate an in-phase component difference, and wherein the processing unit is further configured to determine the phase error by calculating a ratio of quadrature component difference and in-phase component difference or by calculating the arctangent of the quadrature component difference and the in-phase component difference.

6. The device as described by claim 1, wherein the processing unit is selected from a group consisting of a central processor, a field programmable gate array (FPGA), and an application specific integrated circuit (ASIC).

7. The device as described by claim 1, wherein output readings from the sensor device is calibrated to compensate for the phase error.

8. The device as described by claim 1, wherein the processing unit is configured to calculate a difference between the first quadrature component and the second quadrature component to generate a quadrature component difference, and wherein the processing unit is further configured to calculate a difference between the first in-phase component and the second in-phase component to generate an in-phase component difference, and wherein the processing unit is further configured to determine sensitivity of the sensor device based on the quadrature component difference and the in-phase component difference.

9. The device as described by claim 1 further comprising an actuator to generate a change in rotation rate.

10. The device as described by claim 9, wherein the actuator is configured to create a periodic change in rotation rate of periodic estimation and correction of phase errors.

11. The device as described by claim 1, wherein the processing unit is triggered in response to a difference between the first and second rate signals exceeding a first threshold, or in response to a difference between the first and second in-phase components exceeding a second threshold, or in response to a difference between the first and second quadrature components exceeding a third threshold, or in response to a difference between the first and second sensed signal exceeding a fourth threshold.

12. The device as described by claim 1, wherein a phase error correction is applied in response to a change in rotation rate.

13. The device as described by claim 1, wherein the change in rate signal is a difference in average rates over a period of time.

14. The device as described by claim 1, wherein the first rate signal is associated with no motion and wherein the second rate signal is associated with a constant rate, or a transient rate, or a rotation.

15. A device comprising:
a sensor device configured to generate a first and a second sensed rate signals comprising a first and a second in-phase components and a first and a second quadrature components, wherein the first and the second sensed signals are generated by the sensor device in response to application of a first and a second rate signals thereto respectively, and wherein the first and the second sensed signals are generated during a calibration process;
a demodulator configured to sequentially identify the first in-phase component and the first quadrature component, and wherein the demodulator is further configured to identify the second in-phase and quadrature components sequentially and subsequent to identifying the first in-phase and quadrature components; and
a processing unit configured to determine a phase error associated with the sensor device, wherein the phase error is determined based on the first quadrature and in-phase components associated with the first sensed rate signal and is further based on the second in-phase and quadrature components associated with the second sensed rate signal, wherein the processing unit is configured to calculate a difference between the first quadrature component and the second quadrature component to generate a quadrature component difference, and wherein the processing unit is further configured to calculate a difference between the first in-phase component and the second in-phase component to generate an in-phase component difference, and wherein the processing unit is further configured to determine the phase error by calculating the arctangent of the quadrature component difference and the in-phase component difference.

16. The device as described by claim 15 further comprising:
a filter coupled to the demodulator, wherein the filter is configured to generate an averaged component signal received from the demodulator, and wherein the averaged component signal is transmitted to the processing unit for determining the phase error.

17. The device as described by claim 16, wherein the filter is selected from a group consisting of a low pass filter, integrator, and a bandpass filter.

18. The device as described by claim 15, wherein the sensor device is a micro-electro-mechanical system gyroscope.

19. The device as described by claim 15, wherein the processing unit is selected from a group consisting of a central processor, a field programmable gate array (FPGA), and an application specific integrated circuit (ASIC).

20. The device as described by claim 15, wherein output readings from the sensor device is calibrated to compensate for the phase error.

* * * * *